(12) United States Patent
Warfen

(10) Patent No.: US 9,670,904 B2
(45) Date of Patent: Jun. 6, 2017

(54) HYDRAULIC BRAKE DEVICE FOR A WIND TURBINE

(75) Inventor: Karsten Warfen, Sohren (DE)

(73) Assignee: Senvion SE, Hamburg (DE)

( * ) Notice: Subject to any disclaimer, the term of this patent is extended or adjusted under 35 U.S.C. 154(b) by 333 days.

(21) Appl. No.: 13/821,273

(22) PCT Filed: Aug. 31, 2011

(86) PCT No.: PCT/EP2011/004375
§ 371 (c)(1),
(2), (4) Date: Mar. 7, 2013

(87) PCT Pub. No.: WO2012/041433
PCT Pub. Date: Apr. 5, 2012

(65) Prior Publication Data
US 2013/0162014 A1   Jun. 27, 2013

(30) Foreign Application Priority Data

Sep. 30, 2010   (DE) .................. 10 2010 041 824

(51) Int. Cl.
*B60T 13/10*   (2006.01)
*F03D 7/02*   (2006.01)
(Continued)

(52) U.S. Cl.
CPC .......... *F03D 7/0248* (2013.01); *B60T 8/5031* (2013.01); *B60T 13/662* (2013.01); *Y02B 10/30* (2013.01); *Y02E 10/723* (2013.01)

(58) Field of Classification Search
CPC ...... F03D 7/0248; B60T 13/686; B60T 13/14; Y02E 10/723; F15B 11/022; F15B 11/042; F15B 2211/40592
(Continued)

(56) References Cited

U.S. PATENT DOCUMENTS 3,746,404 A * 7/1973 Adahan .................. B60T 8/363
  303/10
5,590,936 A * 1/1997 Reuter .................... B60T 8/341
  303/116.1
(Continued)

FOREIGN PATENT DOCUMENTS

DE   102004057522   4/2006
DE   202007001765   5/2008
(Continued)

*Primary Examiner* — Bradley King
*Assistant Examiner* — Stephen Bowes
(74) *Attorney, Agent, or Firm* — Rankin, Hill & Clark LLP

(57) ABSTRACT

A hydraulic actuation device (1) for a brake device of a wind turbine including a hydraulic control line (10), which runs from a hydraulic system circuit (P) of a wind turbine to at least one brake cylinder (2) of a brake device. At least one restrictor (13) is arranged in the control line (10). At least one branch line (14) includes a pressure regulating member (15) that branches off from the control line (10) upstream of the restrictor (13) in the pressure build-up direction, bypassing the restrictor (13), and leads back into the control line (10) downstream of the restrictor (13). The pressure regulating member (15) open when the pressure present on the output side is low, but closes when the pressure at the pressure regulating member (15) on the output side of the pressure regulating member (15) exceeds a preset closing pressure ($P_S$).

13 Claims, 4 Drawing Sheets

(51) Int. Cl.
*B60T 8/50* (2006.01)
*B60T 13/66* (2006.01)

(58) Field of Classification Search
USPC .......................................................... 91/443
See application file for complete search history.

(56) References Cited

U.S. PATENT DOCUMENTS

| | | | |
|---|---|---|---|
| 5,611,199 A * | 3/1997 | Bray | 60/404 |
| 6,254,197 B1 * | 7/2001 | Lading et al. | 303/2 |
| 7,494,193 B2 * | 2/2009 | Wedekind | F03D 7/0244 |
| | | | 303/2 |
| 2004/0244857 A1 * | 12/2004 | Suzuki et al. | 138/30 |
| 2005/0279593 A1 * | 12/2005 | Uphues | 188/170 |
| 2006/0284482 A1 * | 12/2006 | Yang | B60T 7/122 |
| | | | 303/191 |
| 2007/0052290 A1 * | 3/2007 | Hwang | 303/115.1 |
| 2008/0164751 A1 * | 7/2008 | Wedekind | 303/22.1 |
| 2008/0164752 A1 * | 7/2008 | Wedekind | 303/22.1 |
| 2012/0134816 A1 * | 5/2012 | Andersen et al. | 416/31 |

FOREIGN PATENT DOCUMENTS

| | | |
|---|---|---|
| EP | 1389686 | 2/2004 |
| EP | 1959131 | 8/2008 |
| WO | 03/080414 | 10/2003 |

* cited by examiner

HYDRAULIC BRAKE DEVICE FOR A WIND TURBINE

BACKGROUND OF THE INVENTION

Field of the Invention

The invention relates to a hydraulic actuation device for a brake device of a wind turbine, comprising a hydraulic control line, which runs from a connection for a hydraulic system circuit of a wind turbine to a connection for at least one brake cylinder of a brake device, wherein at least one restrictor or orifice is arranged in the control line. The invention further relates to a corresponding brake device, to a wind turbine, and to a method for braking a shaft of a wind turbine.

The invention relates to the field of rotor brakes for wind turbines. These are typically equipped so that a brake disk, which can be braked by hydraulically controlled brake cylinders using brake shoes, is arranged at a fast shaft of a drive train which is driven by a rotor shaft via a gear box.

The brake is actuated during operation in order to stop the rotor in the event of specific serious disturbances or upon actuation of the emergency stop switch. It is also essential to securely brake the rotor for maintenance and repair work.

Braking occurs with active brake systems in that pressure is applied to the brake cylinders, and thereby the brake cylinders are extended until the brake shoes of the brake cylinder rest against, and brake, the brake disk. In order to prevent the full system pressure, which can amount to approximately 100 bar, from abruptly being present at the brake when actuating the rotor brake, a throttle is typically inserted in the pressure line. Thereby, the pressure only increases slowly at the brake, and vibrations in the system, which arise due to sudden speed variations as a result of strong braking, are avoided.

With this operating control of the rotor brake, a delay time results in that initially the brake gap between the brake shoes and the brake disk must be overcome. Only after the delay time, when the brake shoes contact the brake disk, a braking torque develops at the rotor brake disk.

The delay time also increases due to increasing wear. For this purpose, there are brake systems which compensate at least for the wear using a brake lining tracking system, and set a defined distance for the lining to the brake disk. The path, which must be overcome, before the brake disk is contacted by the brake lining is however not shortened by this.

The delay time, thus the duration from the moment at which the brake is requested, until it engages, amounts between approximately 0.3 and 7 seconds, and possibly up to 10 seconds, depending on the size of the brake gap and the type of the system. An appreciable braking torque develops only after this time.

The reaction of the brakes during emergency stop actuation is therefore relatively sluggish. In addition, in systems in which the brakes are also considered in the load design for limiting rotational speed or for rotational speed reduction, there is a risk that the brake performance is slower than in the design calculations. This can result in unexpected loads in the wind turbine.

Description of Related Art

An electrohydraulic brake module is known from the document EP 1 389 686 A1 that allows proportional brake control by means of a combination of a pressure limiting control valve actuatable by a proportional magnet and an actuatable switching valve, that maintains the generator set rotational speed at least in the event of a power failure. In the event of a power failure, in accordance with the present rotational speed, pressurizing medium is supplied via the switching valve into a working line, and/or via the control valve to a tank, in order to proportionally modulate the braking effect, wherein the proportional pressure limiting control valve performs the discharge control such that the generator maintains the set rotational speed.

The document DE 10 2004 057 522 A1 discloses a brake device for a wind turbine, in which a brake valve arrangement comprises a 3/2-way seat valve, via which a pressure chamber of a hydraulically actuatable brake cylinder is connected to a source of pressurizing medium for braking, and to a pressurizing medium sink for releasing the brake. The directional control seat valve allows a leak-free blocking of the brake cylinder.

The document EP 1 959 131 A2 relates to a wind turbine having a hydraulically actuatable rotor brake for a drive train, which has at least one hydraulically actuatable brake cylinder, the braking torque of which increases with increasing hydraulic pressure, wherein upon actuating the brake, a volume of hydraulic fluid is supplied through a pressure reducing valve into the brake cylinder and in the pressure line thereof, wherein a storage reservoir with hydraulic fluid is provided that is connected to the pressure line. Here, two pressure reducing valves are provided, one of which reduces a present system pressure to the brake pressure, and the other reduces the present system pressure to a holding pressure.

BRIEF SUMMARY OF THE INVENTION

Based on this prior art, the object of the present invention is to allow the hydraulic braking of a drive train of a wind turbine having the shortest possible delay time while at the same time having minimal structural loading of the wind turbine.

The object is achieved by a hydraulic actuation device for a brake device of a wind turbine, comprising a hydraulic control line, which runs from a connection for a hydraulic system circuit of a wind turbine to a connection for at least one brake cylinder of a brake device, wherein at least one restrictor or orifice is arranged in the control line, that is further developed in that at least one branch line having a pressure regulating member is provided, that branches from the control line upstream of the restrictor or orifice in the pressure build-up direction, bypassing the restrictor or orifice, and leads back into the control line downstream of the restrictor or orifice, wherein the pressure regulating member which is open when the pressure present on the output side is low, closes when the pressure present at the pressure regulating member on the output side of the pressure regulating member exceeds a preset or pre-settable closing pressure.

According to the invention, the pressure build-up direction is understood to be the direction in which the pressure is conveyed or built up. In the present case, that means the system circuit is upstream and the at least on brake cylinder is downstream with respect to the control line and the hydraulic control elements arranged therein. Thus, the pressure build-up direction runs in the direction toward the brake cylinder at which a brake pressure is to build up.

The invention is based on the fundamental idea that a pressure regulating member is connected in parallel to the present orifice or restrictor, that after issuing a brake command and up to attaining a closing pressure, permits a significantly higher volume flow of hydraulic fluid for pressure build-up at the brake cylinder than the orifice or restrictor, and thus a significantly faster advance of the brake linings at the brake cylinder is attained in the direction towards the brake disk. Thereby, the brake gap is overcome more quickly, and the delay time is reduced. At and above the closing pressure of the pressure regulating member, this member becomes ineffective, that is, the volume flow through the pressure regulating member is completely discontinued, and the original characteristic curve of the brake pressure build-up via the restrictor, or respectively the orifice is maintained again. This characteristic curve was configured such that the load limits of the wind turbine and the gear box are not exceeded while braking the drive train.

Typical closing pressures are between 10 and 30 bar, particularly approximately 15 bar. The exact selection depends on the type and on the design of the wind turbine and the components thereof.

The actuation device according to the invention has the advantage that the brake quickly attains an initial braking torque, and the delay time is reduced, and that then the known brake characteristic curve is maintained with lower torque increase via the present restrictor or orifice. The corresponding actuation device, due to the known and reliable components, is more favorable than a lining tracking system.

In addition, the control electronics do not need to be upgraded, when the additional component is designed as passive, that is, without electronic control. Thereby, the topology of the actuation device is simple and robust, because with respect to electrical technology, only passive components are used. This increases the ease of service of the actuation device according to the invention. Both in the event of an emergency stop actuation as well as in the event of a system stop for service work, the braking procedure is started more quickly while simultaneously maintaining the permissible loads of the wind turbine. An additional service switch or push-button for a "rapid" braking is also not necessary.

In an advantageous development of the invention, it is provided that several branch lines having several pressure regulating members are provided which are preset or can be set respectively to the same or differing closing pressures. With the same set closing pressures, the volume flow in the low pressure phase is further increased, whereby the brake gap is overcome more quickly, and the delay time is further reduced. With differing closing pressures of the various pressure regulating members, the pressure progression curve can be modulated even in the low pressure range so that arising loads during the initial engaging of the brake remain within the safety parameters of the wind turbine.

In one preferred embodiment, the at least one pressure regulating member is designed as a pressure regulating valve or as a controlled multi-way valve, particularly a 2/2-way valve, whose open state changes with falling below or exceeding the closing pressure, as a pressure reducing valve, or as a proportional valve, the opening of which is closed depending on the present pressure at the output side of the pressure regulating member via a preset or adjustable pressure range up to attaining the closing pressure. The named hydraulic components are all suited for the purpose to permit passage of a high volume flow of hydraulic fluid with low pressure present on the output side, and, upon exceeding the closing pressure, to prevent this volume flow.

Thus, a pressure regulating valve is a passive component which, when output side pressure is low, permits the flow of hydraulic fluid, and upon exceeding the closing pressure, closes the passage. A controlled 2/2-way valve requires control electronics and a pressure gauge in the branch line downstream of the valve. A pressure reducing valve closes the volume flow in proportion to the pressure prevailing on the output side, and is closed completely when the pressure on the output side exceeds the closing pressure. A proportional valve can also be controlled using different control curves, and can be controlled over a pressure range from a completely open setting to a completely closed setting, wherein the volume flow can be controlled via the variably changeable opening size. The different design variants have the advantages of the simplicity and robustness of the passive control elements on the one hand, and the variability and the controllability of the controllable control elements on the other.

Preferably the control line can be blocked upstream of the upstream branching of the branch line by means of a controllable blocking element, particularly by means of a blocking valve or a multi-way valve, particularly a 2/2-way valve. A control signal, with which braking is initiated, can lead to the fact that a blocking by the blocking element is released, and the hydraulic actuation device and subsequently the brake cylinder are pressurized with hydraulic fluid in order to build up brake pressure.

If a relief line with a relief element is preferably branched off downstream of the downstream connection of the branch line to the control line, wherein the relief element is designed particularly as a controllable blocking valve, as a controllable multi-way valve, particularly a 2/2-way valve, as a pressure limiting valve, as a pressure relief valve, or as a safety valve, then the hydraulic actuation device can be relieved in the event of high pressures occurring in the lines, which exceed the safety pressures.

Alternatively, in an advantageous design, the safety of the hydraulic actuation device can be guaranteed if a multi-way valve, particularly a 3/2-way valve is arranged in the control line upstream of the upstream branching of the branch line, by means of which the downstream part of the control line can be switched alternately connectible to the connection for a hydraulic system circuit and to a relief line. For this purpose it is advantageous if the return flow through the restrictor, or the orifice, occurs quickly enough in order to effectively discharge the downstream part of the actuation device.

An advantageous improvement of the braking characteristic curve is attained in that a stub line is branched from the control line to a storage reservoir downstream of the downstream connection of the branch line to the control line, the storage reservoir having in particular a gas pressurizing device, wherein the storage reservoir is filled or emptied as long as the pressure present in the stub line at the storage reservoir exceeds a minimum storage pressure, and the storage reservoir is inactive if the minimum storage pressure is fallen short of in the stub line. Above the minimum storage pressure, the storage reservoir admits hydraulic fluid, whereby the characteristic curve is further flattened, and the load occurring during braking is further reduced. The storage reservoir has the additional effect that possible pressure fluctuations in the system can be equalized.

The behavior of the system can be influenced by expedient selection of the minimum storage pressure in relation to the closing pressure of the pressure regulating valve designed as a pressure regulating member. Thus, a soft contact of the brake linings can be attained in that the minimum storage pressure of the storage reservoir is set to a smaller value than the pressure of the pressure regulating valve. A fast contact of the brake linings is attained in that the minimum storage reservoir pressure of the storage reservoir is set to a larger value than the pressure of the pressure regulating valve. The minimum storage reservoir pressure of the storage reservoir can also be set however to the pressure of the pressure regulating valve, or respectively pressure regulating member.

A storage reservoir with a gas pressurizing device has a membrane, which divides the volume of the storage reservoir into two halves. A compressible gas filling is located in one region. Thus, the storage reservoir can accept or supply hydraulic fluid in the event of pressure increases and pressure decreases. Alternatively, a bladder storage reservoir or piston storage reservoir can also be used according to the invention.

Preferably the closing pressure of the pressure regulating valve is preset or can be set to greater than, less than, or equal to the minimum storage pressure, particularly of the storage reservoir, particularly depending on a preset or pre-settable pressure difference from each other. Thus, the braking characteristic can be set or preset as a soft or hard braking, and in particular can be easily adapted to the type of wind turbine.

If the pressure regulating member that is connected in parallel to the restrictor or orifice, is designed on the output side for pressures that are not very high, then for the protection thereof it is preferably provided that the branch line downstream of the pressure regulating member has a protection member in the form of a check valve opening in the pressure build-up direction or a controllable blocking member, wherein the protection member blocks the flow when the pressure present at the downstream output of the pressure regulating member exceeds the safety pressure for which the load pressure regulating member is designed, or when the pressure prevailing downstream of the protection member exceeds the pressure prevailing upstream of the protection member. Thereby it is guaranteed that a high pressure, that is damaging for the pressure regulating member, and that is further increased by hydraulic fluid still flowing through the restrictor or the orifice, is not applied to the output side of the pressure regulating member designed, for example, as a pressure regulating valve.

In order to guarantee that the pressure regulating member is not damaged even in the case of a certain leakiness of such a protection member, it is provided in an advantageous further development that a branch relief line having a pressure limiting member with pre-set or adjustable limit pressure is branched off from the branch line between the pressure regulating member and the protection member, wherein the pressure limiting member is designed in particular as a spring preloaded or controllable non-return valve opening in the pressure relief direction, as a preset, adjustable or controllable pressure limiting valve, as a pressure relief or safety valve, or as a controllable blocking valve or multi-way valve, particularly 2/2-way valve. In this manner, a damaging overpressure can be diverted from the output side of the pressure regulating member for the relief thereof.

Preferably a check valve opening counter to the pressure build-up direction is provided that bypasses the restrictor and the pressure regulating valve. In this case, an overpressure on the side of the brake cylinder with respect to the system pressure can be discharged via the pressure regulating valve. This is particularly advantageous in conjunction with a controllable multi-way valve, by means of which a connection can be produced upstream of the branching to the restrictor and to the pressure regulating valve, to a relief line. A very rapid and unrestricted discharge occurs using the non-return valve. The function of the non-return valve can be implemented also in the pressure regulating valve.

The object addressed by the invention is also achieved by a hydraulic brake device of a wind turbine having at least one hydraulically actuatable brake cylinder and a hydraulic actuation device according to the invention, described above, and by a wind turbine having a hydraulic brake device according to the invention. Both have the features, properties and advantages of the previously described hydraulic actuation device.

The object addressed by the invention is also achieved by a method for braking a shaft of a wind turbine by means of at least one brake cylinder, which can be brought from an open position into a braking position by applying hydraulic pressure. Upon initiating a braking procedure in the presence of low hydraulic pressure at the brake cylinder, the pressure buildup at the brake cylinder occurs with a high volume flow of hydraulic fluid in a hydraulic actuation device, particularly an actuation device according to the invention described above, until a closing pressure is attained. After exceeding the closing pressure, the pressure buildup at the brake cylinder occurs with a lower or throttled volume flow until attaining a maximum brake pressure. In the scope of the invention, an open position of the brake cylinder in this context is understood to be a state in which the brake is released.

With the hydraulic activation device according to the invention, the initially acting high volume flow of hydraulic fluid ensures that the brake gap is overcome rapidly and the delay time is minimized, whereas the reduction of the volume throw through the already present restrictor or orifice ensures that after closing the pressure regulating member, the known braking characteristic curve is maintained and does not result in overloading the wind turbine.

The closing pressure is selected advantageously so that a brake gap between a brake shoe of the brake cylinder and a brake disk is overcome when the closing pressure is attained, wherein a braking torque attained upon attaining the closing pressure, and the braking of a rotor of the wind turbine achieved thereby, lie within preset load limits of the wind turbine. In advantageous further developments, it is provided to modulate the braking characteristic curve in the low-pressure range, in that a parallel circuit of several branch lines and pressure regulating members with different closing pressures is provided. In the upper pressure range the braking characteristic curve is advantageously flattened, in that a storage reservoir, particularly having gas pressurizing device, is provided downstream of a restrictor.

In a preferred further development it is provided that the closing pressure of the pressure regulating valve designed as a pressure regulating member is preset or can be set to greater than or less than or equal to a minimum storage reservoir pressure, particularly of the storage reservoir, in particular depending on a preset or pre-settable pressure difference from each other.

The features, properties and advantages named in conjunction with the different subject matters of the invention, i.e., the actuation device, the wind turbine, and the method, also apply without restriction to the other subject matters of the invention.

BRIEF DESCRIPTION OF THE DRAWINGS

The invention is described below, without restricting the general idea of the invention, using exemplary embodiments with reference to the drawings, whereby we expressly refer to the drawings with regard to the disclosure of all details according to the invention that are not explained in greater detail in the text. In the figures.

In the following figures, the same or similar types of elements or respectively corresponding parts are provided with the same reference numbers so that a corresponding re-introduction can be omitted.

DETAILED DESCRIPTION OF THE INVENTION

Figure 1:
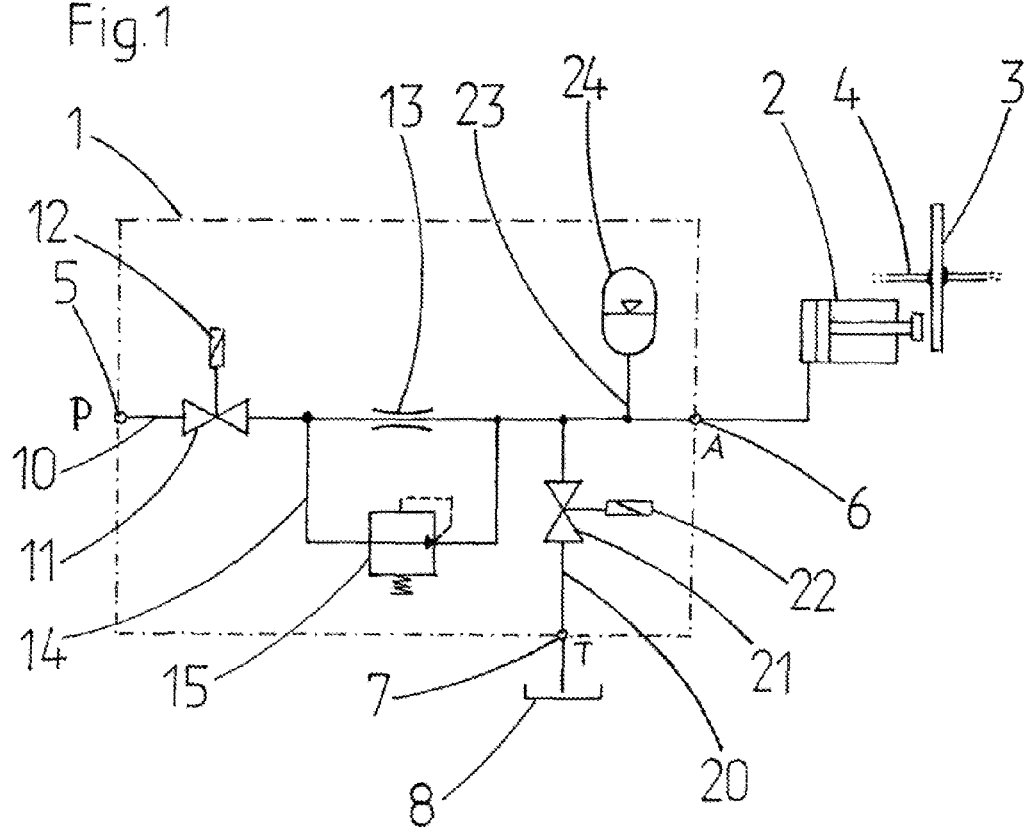
FIG. 1 is a schematic of a hydraulic actuation device according to the invention.

FIG. 1 shows a schematic diagram of one embodiment of a hydraulic actuation device 1 according to the invention. The actuation device 1 is represented as a functional unit by a dot-dashed line. The components shown therein need not be housed in a common housing, however.

The hydraulic actuation device 1 is connected or can be connected to a hydraulic system circuit, indicated by the letter P, and not shown in more detail, using a connection 5, from which a control line 10 runs to a connection 6 ("A") for hydraulic brake cylinders 2. Such a hydraulic brake cylinder 2 is also shown. A brake shoe of the brake cylinder 2 engages at a brake disk 3 at a shaft 4 of a drive train of a wind turbine. A brake gap is opened between the brake shoe of the brake cylinder 2 and the brake disk 3. The brake cylinder 2 is thus in a position in which the shaft 4 and the drive train can rotate unbraked.

In the hydraulic actuation device, initially, a blocking valve 11 that can be operated by means of a control coil 12 is arranged in the control line 10 downstream of the connection 5. In the normal operating state of the wind turbine, the further course of the control line 10 and the brake cylinder 2 are blocked from the system circuit P by means of the blocking valve 11, and thus are without pressure. As soon as a brake signal is generated, the blocking valve 11 is set to "pass through" by means of the control coil 12. The blocking valve 11 is typically designed as a 2/2-way valve.

When the blocking valve 11 is in the open position, hydraulic fluid flows through the blocking valve 11 into the downstream part of the control circuit 10 and encounters a branching point at which a branch line 14 branches off from the control line 10.

In the control line 10 itself, downstream of the branching, a restrictor 13 or throttle is arranged which can also be replaced by an orifice, and which limits, or respectively restricts or throttles, the volume flow of hydraulic fluid such that a smooth braking characteristic curve is set for the brake cylinder 2. Hereby excessive loads acting on the wind turbine and the components thereof are avoided during braking. The branch line 14 rejoins the control line 10 downstream of the restrictor 13.

A pressure regulating valve 15 is arranged in the branch line 14, and thus is connected in parallel to the restrictor 13. The pressure regulating valve 15 is spring preloaded, and in the unloaded state passes the hydraulic fluid through. The cross-section of the opening in the pressure regulating valve 15 is significantly larger than the cross-section of the restrictor 13, such that with low pressure, that is, in the unloaded state of the pressure regulating valve 15, a larger volume flow than the sum of the volume flows through the pressure regulating valve 15 and the restrictor 13, can arrive at the brake cylinder 2. Thereby the brake gap is quickly overcome and the delay time is minimized. The pressure regulating valve 15 is pressurized by the pressure present at the output side via a control line, shown dashed, such that upon exceeding a closing pressure, the pressure regulating valve 15 is brought into the closed position. When this is the case, now only the restrictor 13 in the control line 10 is open, so that the volume flow is reduced, and the further application of the brake proceeds more slowly than before. Peaks in the loading of the wind turbine and the gearbox are hereby avoided.

A relief line 20 branches off from the control line 10 downstream of the inflow point of branch line 14 into the control line 10. In the exemplary embodiment represented in FIG. 1, a blocking valve 21, which is controlled via a control coil 22, is arranged in the relief line 20. The relief line 20 flows to a connection 7 for a tank 8, which is also labeled with "T".

A stub line 23 to a storage reservoir 24 with a gas pressurizing device is also designed in the control line 10 downstream of the inflow point of the branch line 14. The storage reservoir 24 operates such that upon exceeding a minimum storage pressure, the pre-tensioning of the gas pressurizing device is overcome, and hydraulic fluid can enter into the storage reservoir 24. Upon exceeding the minimum reservoir storage pressure in the control line 10, or respectively the stub line 23, the storage reservoir 24 then serves as a buffer, whereby on the one hand the braking characteristic curve is flattened, and on the other hand pressure fluctuations in the control line 10 are equalized.

The connections 5, 6, and 7 to the control circuit P, brake circuit A, and discharge tank T, are arbitrary connections in the scope of the invention that can represent, for example, an outlet connection in a tank, a connection of a line to a brake cylinder, or a connection line to the hydraulic system circuit. Thus, the term "connection" according to the invention can be broadly interpreted.

Figure 2:
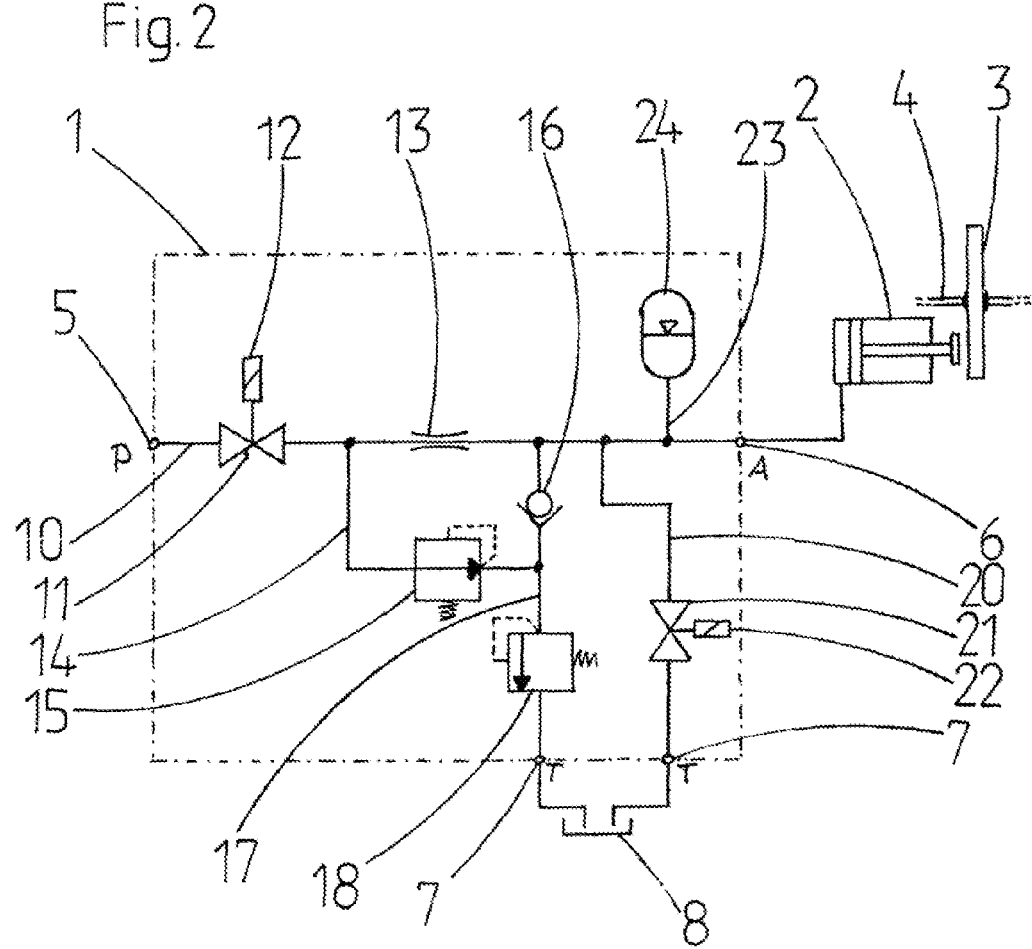
FIG. 2 is a schematic of a further variant of an actuation device according to the invention.

FIG. 2 shows an alternative version of the hydraulic actuation device 1 according to FIG. 1. In contrast to the actuation device 1 according to FIG. 1, the pressure regulating valve 15 is not designed on the output side to withstand the maximum brake pressure. Therefore, in the further course of the branch line 14 before flowing into the control line 10, a check valve 16 is provided which prevents a further pressure increase through the restrictor 13 in the control line 10 from being applied at the output of the pressure regulating valve 15. The pressure at the output of the pressure regulating valve 15 therefore remains ideally at the value of the closing pressure.

For the case that a leakage flow is present through the check valve 16, and in this way the pressure slowly increases at the output side of the pressure regulating valve 15, a branch relief line 17 branches off between the pressure regulating valve 15 and the check valve 16, and a pressure limiting valve 18 is arranged therein that opens upon exceeding a permissible safety pressure of the pressure regulating valve 15, and by discharging hydraulic fluid reduces the pressure between the pressure regulating valve 15 and the check valve 16 again to the permissible amount. The branch relief line 17 leads to a connection 7 to a tank 8. The pressure limiting valve 18 in the normal state is spring preloaded in a closed position, that is, it does not pass any hydraulic fluid. The pressure limiting valve 18 is pressurized by the pressure present on the input side via a control line, shown by a dashed line. When the pressure present at the input side of the pressure limiting valve 18 exceeds a threshold value, the pressure limiting valve 18 moves counter to the spring preloading into a passing position such that hydraulic fluid can flow through the pressure limiting valve 18.

The remaining components of the hydraulic actuation device 1 according to FIG. 2 correspond to those of FIG. 1.

Figure 3:
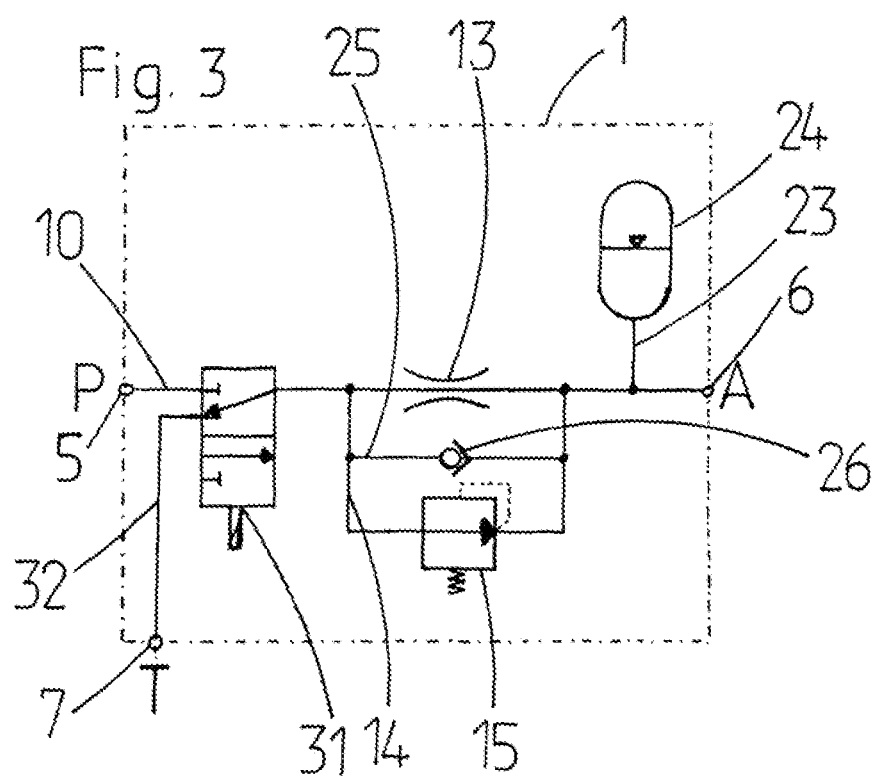
FIG. 3 is a schematic of a detail of an alternative actuation device according to the invention.

FIG. 3 shows a diagrammatic schematic representation of a further hydraulic actuation device according to the invention. The part, which is located upstream of the branching between the control line 10 and the branch line 14, comprises in this case, instead of a controllable blocking valve 11 according to FIG. 1 and FIG. 2, a 3/2-way valve 31, which in the spring pre-loaded and non-active position thereof passes hydraulic fluid from connection 5 for the hydraulic system circuit P into the further control line 10, whereas a second input that is connected to a relief line 32 and that opens into a connection 7 for a tank T, is blocked. As soon as there is a signal present for switching the 3/2-way valve 31, the valve is switched into the second setting in which the downstream part of the control line 10 and all components lying behind are connected to the relief side 32. Thus, the hydraulic actuation device is relieved downstream of the 3/2-way valve 31, just as is the brake cylinder 2. The control line 10 coming from the hydraulic system circuit is terminated in the 3/2-way valve in this switch position. A relief on the other side of the restrictor 13 and pressure regulating valve 15, as in FIG. 1 or 2, is omitted.

This type of relief can be used particularly advantageously when the restrictor 13 is large enough such that an emptying of the lines in the actuation device 1 and in the brake cylinder 2 can occur rapidly enough. Additionally or alternatively, a check valve 26 that bypasses the pressure regulating valve 15 in the direction to the tank T, is provided in a bypass line 25. With this, the emptying occurs rapidly regardless of the size of the restrictor 13. Such a bypass can also be implemented in the pressure regulating valve 15.

Figure 4:
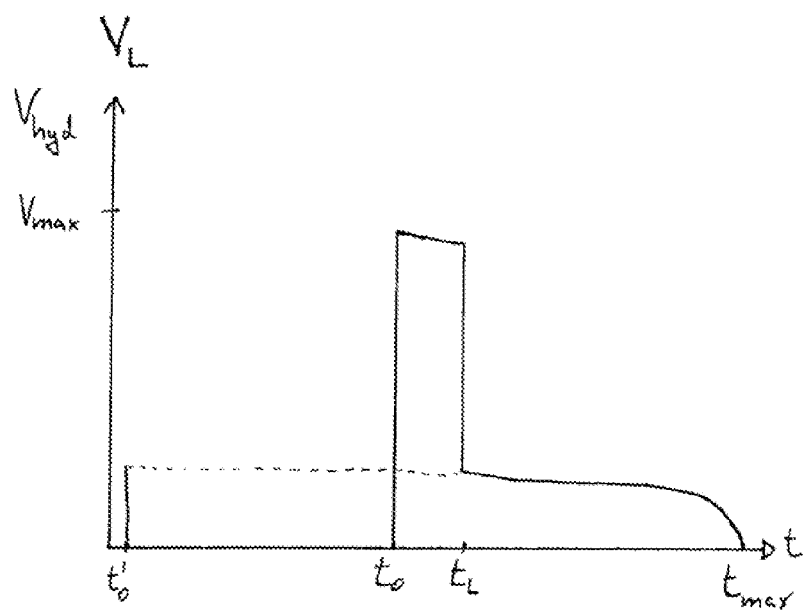
FIG. 4 is a graph of the temporal progression of the volume flow with an actuation device according to the invention.

FIG. 4 schematically represents the temporal progression of the volume flow of hydraulic fluid upon initiating a braking process. A brake signal occurs at time $t_0$. At this time, for example with the hydraulic actuation device 1 according to FIG. 1, a blocking valve 11 is opened. Hydraulic fluid flows through the blocking valve 11 and the control line 10, and through the restrictor 13 as well as the opened pressure regulating valve 15. Thus, the volume flow is very high and at the start attains a value $V_{max}$. In doing so, because a certain pressure builds up in the actuation device 1 and the brake cylinder 2, the volume flow initially decreases slightly.

Shortly before time $t_L$, the brake shoe contacts the brake disk 3 such that the pressure in the control line 10 increases very rapidly. As a result, the closing pressure of the pressure regulating valve 15 is exceeded such that it is becoming closed at time $t_L$. Due to the closing of the pressure regulating valve 15, the volume flow rapidly falls to a fraction of the previous value thereof, namely approximately to a value $V_L$, which corresponds to the volume flow through the restrictor 13 alone.

The curve describes the case in which the closing pressure of the pressure regulating valve 15 is set to the same pressure as the opening pressure, or respectively minimum storage reservoir pressure $P_{Sp}$ of the storage reservoir 24. The storage reservoir 24 is therefore also opened at time $t_L$. Due to the further increase of the pressure in the brake cylinder 2, in the sections of the control line 10 leading there, and in the storage reservoir 24, the volume flow continues to decrease slightly in the following, until a maximum brake pressure is attained. At this point the volume flow stops completely. This point is labeled $t_{max}$.

For comparison purposes, the progression of the volume flow is shown dashed for the typical case in which a restrictor 13 is used that is not bypassed by the pressure regulating valve 15. In this case a lower volume flow is present from time $t'_0$. The areas under the dashed curve, which follows the solid curve after $t_L$, and under the solid curve are equal. With initiating a braking procedure, according to the invention there is a time saving of the difference $t_0 - t'_0$.

The curve represented in FIG. 4 is understood as a principle drawing that represents the principle, but is however not true to scale.

In the cases that are not represented, that the minimum storage reservoir pressure exceeds or lies below the closing pressure of the pressure regulating valve 25, there is a general flattening of the curve respectively at a time at which the minimum storage reservoir pressure is exceeded. Because the total quantity of hydraulic fluid at time $t_{max}$ depends only on the maximum brake pressure and volume present in the system, the integral area under the corresponding curves is equal in the diagram according to FIG. 4, independent of the minimum storage reservoir pressure $P_{Sp}$.

Figure 5:
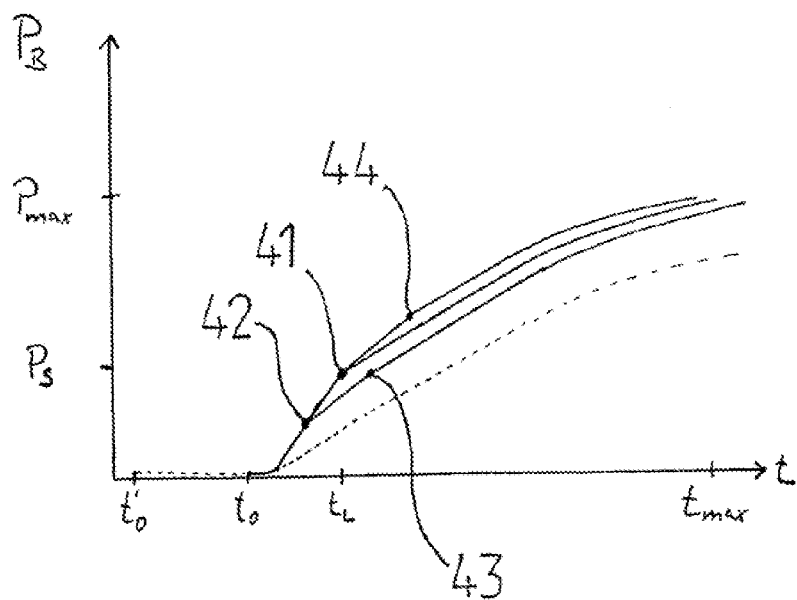
FIG. 5 is a graph of the temporal progression of the brake pressure with an actuation device according to the invention.

FIG. 5 shows schematically, also solely as a principle representation and not true to scale, the pressure progression of the brake pressure $P_B$ as a function of time.

For comparison purposes, the pressure progression of a known hydraulic system in which hydraulic fluid flows exclusively via a restrictor to a brake cylinder, is represented by a dashed line. A brake signal is generated at time $t'_0$. Due to the strictly limited volume flow, a comparatively long time elapses up to a brake shoe contacting a brake disk, and the pressure increasing. Due to the further throttled volume flow, the brake pressure also increases more slowly.

For the hydraulic system according to the invention, three cases are represented. In a first case, the minimum storage reservoir pressure $P_{Sp}$ corresponds to the closing pressure of the pressure regulating valve 15. A brake signal is generated at time $t_0$. At this time, the blocking valve 11 opens and the hydraulic fluid flows through the blocking valve 11 into the control line 10 and the following components. Because this occurs with a large volume flow through both the restrictor 13 and the pressure regulating valve 15, pressure builds up more rapidly, up to the closing pressure $P_S$ of the pressure regulating valve 15, which is attained at time $t_L$ at point 41.

At time $t_L$ the brake disk 3 is initially lightly contacted by the brake cylinder 2, or respectively by the actuated brake shoe. However a strong braking torque that would strongly load the gearbox, or respectively the wind turbine, is not yet built up. Afterwards, the curve of the pressure build-up significantly flattens because the pressure regulating valve 15 closes and the storage reservoir 24 opens. Therefore, no impermissible high loads occur in this progression.

In the second case, in which the minimum storage reservoir pressure lies below the closing pressure of the pressure regulating valve 15, the storage reservoir 24 opens already at point 42, after which the progression of the curve flattens and proceeds below that of the first case. The closing pressure of the pressure regulating valve 15 at point 43 is also attained only later, after which the curve flattens further.

In the third case, the minimum storage reservoir pressure exceeds the closing pressure of the pressure regulating valve 15. The pressure increase up to point 41 at time $t_L$ corresponds to that of the first curve. Then, the curve flattens due to the closing of the pressure regulating valve 15. However, because the storage reservoir 24 is not yet open, the curve flattens less than in the first case. The minimum storage reservoir pressure is first attained at point 44, the storage reservoir is opened and the curve flattens further.

Thus in the first case, an average braking progression is set, and in the second case a softer progression and in the third case a more abrupt progression.

In comparison to the dashed curve progression without a pressure regulating valve 15, there is a time difference between $t'_0$ and $t_0$, which is the delay time that is saved. This can amount to several seconds. This leads to the fact that the reaction with the actuation device 1 according to the invention is spontaneous even with emergency stop actuation. In addition, the risk that the braking behavior is slower than determined in the design calculations, is eliminated. Thus, unexpected loads are also avoided.

All named features, including those to be taken from the drawings alone, and individual features, which are disclosed in combination with other features, are considered individually and in combination as essential to the invention. Embodiments according to the invention can be realized through individual features or a combination of several features.

LIST OF REFERENCE NUMBERS 1 hydraulic actuation device
2 brake cylinder
3 brake disk
4 shaft
5 connection for the hydraulic system circuit
6 connection for the hydraulic brake cylinder
7 connection for the tank
8 tank
9 control line
10 blocking valve
11 control coil
12 restrictor
13 branch line
14 pressure regulating value
15 check valve
16 branch relief line
17 pressure limiting valve
20 relief line
21 blocking valve
22 control coil
23 stub line
24 storage reservoir with gas pressurizing device
25 bypass line
26 check valve
31 3/2-way valve
32 relief line
41 $P_S = P_{Sp}$
42 $P_{Sp}$, when $P_S > P_{Sp}$
43 $P_S$, when $P_S > P_{Sp}$
44 $P_{Sp}$, when $P_S > P_{Sp}$
A working circuit
P system circuit
$P_B$ brake pressure
$P_S$ closing pressure
$P_{Sp}$ minimum storage reservoir pressure
$P_{max}$ maximum brake pressure
T tank
$t_0$, $t_0'$ start time
$t_L$ time at attaining closing pressure
$t_{max}$ time at maximum brake pressure
$V_{hyd}$ volume flow of hydraulic fluid
$V_L$ throttled volume flow
$V_{max}$ volume flow through throttle and branch line

The invention claimed is:

1. A hydraulic actuation device (1) connected to a wind turbine, the hydraulic actuation device (1) comprising:
   a hydraulic control line (10) that communicates hydraulic fluid from a connection (5) for a hydraulic system circuit (P) of the wind turbine to a connection (6) for at least one brake cylinder (2) of a brake device of the wind turbine,
   at least one throttle (13) is arranged in the control line (10), and
   at least one branch line (14) having a pressure regulating member (15) that is connected in parallel to the at least one throttle (13), wherein the at least one branch line (14) branches off from the control line (10) upstream of the throttle (13) in a pressure build-up direction so as to bypass the throttle (13) and lead back into the control line (10) downstream of the throttle (13),
   wherein the pressure regulating member (15) is open when the pressure on an output side is low so as to allow the hydraulic fluid to the at least one brake cylinder (2) at a volume that is greater than a volume of the hydraulic fluid that is supplied through the at least one throttle (13), but closes when the pressure at the pressure regulating member (15) on the output side of the pressure regulating member (15) exceeds a preset closing pressure ($P_S$) such that a load limit of the wind turbine is not exceeded while braking a drive train of the wind turbine,
   wherein a relief line (20) with a relief member (21) is branched off downstream of a downstream connection of the branch line (14) to the control line (10), and
   wherein the relief member (21) is a controllable blocking valve (21) as a pressure limiting valve.

2. The hydraulic actuation device (1) according to claim 1,
   wherein downstream of the downstream connection of the branch line (14) to the control line (10), a stub line (23) branches off from the control line (10) to a storage reservoir (24) with a gas pressurizing device, and
   wherein the storage reservoir (24) is filled or emptied as long as the pressure in the stub line (23) at the storage reservoir (24) exceeds a minimum storage reservoir pressure ($P_{Sp}$), and the storage reservoir (24) is inactive when pressure in the stub line (23) falls below the minimum storage reservoir pressure ($P_{Sp}$).

3. The hydraulic actuation device (1) according to claim 2, wherein the closing pressure ($P_S$) of the pressure regulating member (15) is preset or can be set greater than or less than or equal to the minimum storage reservoir pressure ($P_{Sp}$) depending on a preset pressure difference from each other.

4. The hydraulic actuation device (1) according to claim 1, wherein the pressure regulating member (15) is a 2/2-way valve.

5. The hydraulic actuation device (1) according to claim 1,
   wherein the branch line (14) downstream of the pressure regulating member (15) has a protection member (16) that is a check valve (16) opening in the pressure buildup direction,
   wherein the protection member (16) blocks through flow when the pressure prevailing downstream of the protection member (16) exceeds the pressure prevailing upstream of the protection member (16).

6. The hydraulic actuation device (1) according to claim 5, wherein a branch relief line (17) having a pressure limiting member (18) with a preset or adjustable limiting pressure is branched off from the branch line (14) between the pressure regulating member (15) and the protection member (16), and wherein the pressure limiting member (18) is a spring preloaded or controllable non-return valve opening in the pressure relief direction, as a preset, adjustable or controllable pressure limiting valve (18), as a pressure relief or safety valve, or as a controllable blocking valve or multi-way valve.

7. The hydraulic actuation device (1) according to claim 1, wherein the control line (10) is blocked upstream of an upstream branching of the branch line (14) with a controllable blocking member (11, 31).

8. The hydraulic actuation device (1) according to claim 7, wherein the controllable blocking member is a blocking valve.

9. The hydraulic actuation device (1) according to claim 7, wherein the controllable blocking member is a multi-way valve.

10. The hydraulic actuation device (1) according to claim 7, wherein the controllable blocking member is a 2/2-way valve.

11. A method for braking a shaft (4) of a wind turbine by way of at least one brake cylinder (2), which upon presence of a hydraulic pressure can be brought from an open position into a braking position, comprising:

providing a hydraulic actuation device (1) of the wind turbine, the hydraulic actuation device (1) comprising a hydraulic control line (10) that communicates hydraulic fluid from a connection (5) for a hydraulic system circuit (P) of the wind turbine to a connection (6) for the at least one brake cylinder (2) of a brake device of the wind turbine, at least one throttle (13) is arranged in the control line (10), and at least one branch line (14) having a pressure regulating member (15) that is connected in parallel to the at least one throttle (13), wherein the at least one branch line (14) branches off from the control line (10) upstream of the throttle (13) in a pressure build-up direction so as to bypass the throttle (13) and lead back into the control line (10) downstream of the throttle (13), wherein the pressure regulating member (15) is open when the pressure on an output side is low so as to allow the hydraulic fluid to the at least one brake cylinder (2) at a volume that is greater than a volume of the hydraulic fluid that is supplied through the at least one throttle (13), but closes when the pressure at the pressure regulating member (15) on the output side of the pressure regulating member (15) exceeds a preset closing pressure ($P_S$) such that a load limit of the wind turbine is not exceeded while braking a drive train of the wind turbine, wherein upon initiating a braking procedure in a presence of low hydraulic pressure ($P_B$) at the brake cylinder (2), a pressure build-up at the brake cylinder (2) occurs in the hydraulic actuation device (1), with a high volume flow of hydraulic fluid, until a closing pressure ($P_S$) is attained, and wherein after exceeding the closing pressure ($P_S$), the pressure build-up at the brake cylinder (2) occurs with a lower or throttled volume flow ($V_L$) until attaining a maximum brake pressure ($P_{max}$).

12. The method according to claim 11, wherein the closing pressure ($P_S$) is selected such that a brake gap between a brake shoe of the brake cylinder (2) and a brake disk (3) is overcome when the closing pressure ($P_S$) is attained, and wherein a braking torque is attained upon attaining the closing pressure ($P_S$) and the braking of a rotor of the wind turbine lies within preset load limits of the wind turbine.

13. The method according to claim 11, wherein the closing pressure ($P_S$) of the pressure regulating member (15) is preset or can be set greater than or less than or equal to a minimum storage reservoir pressure ($P_{Sp}$), depending on a preset pressure difference from each other.

* * * * *